US008665959B2

(12) United States Patent
Chen et al.

(10) Patent No.: US 8,665,959 B2
(45) Date of Patent: Mar. 4, 2014

(54) BLOCK AND PARTITION SIGNALING TECHNIQUES FOR VIDEO CODING

(75) Inventors: Peisong Chen, San Diego, CA (US);
Marta Karczewicz, San Diego, CA (US); Wei-Jung Chien, San Diego, CA (US); Xianglin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 674 days.

(21) Appl. No.: 12/979,876

(22) Filed: Dec. 28, 2010

(65) Prior Publication Data

US 2011/0249745 A1  Oct. 13, 2011

Related U.S. Application Data

(60) Provisional application No. 61/323,257, filed on Apr. 12, 2010.

(51) Int. Cl.
*H04N 7/12* (2006.01)

(52) U.S. Cl.
USPC .............................. 375/240.16; 375/240.24

(58) Field of Classification Search
USPC .................................. 375/240.16, 240.24
See application file for complete search history.

(56) References Cited

U.S. PATENT DOCUMENTS

| | | | |
|---|---|---|---|
| 7,474,699 B2 * | 1/2009 | Kobayashi et al. ...... | 375/240.16 |
| 7,852,916 B2 * | 12/2010 | Duvivier .................. | 375/240 |
| 2004/0252768 A1 * | 12/2004 | Suzuki et al. ............ | 375/240.24 |
| 2005/0123282 A1 * | 6/2005 | Novotny et al. ......... | 386/111 |
| 2007/0183491 A1 * | 8/2007 | Pearson et al. ........... | 375/240 |
| 2008/0260027 A1 | 10/2008 | Karczewicz | |
| 2010/0086030 A1 | 4/2010 | Chen et al. | |

OTHER PUBLICATIONS

Lim et al., "Description of Video Coding Technology Proposal by SK Telecom, Sejong Univ. and Sungkyunkwan Univ." (JCTVC-A113) Joint Collaborative Team on Video Coding (JCT-VC) of ITU-T SG16 WP3 and ISO/IECJTC1/SC29/WG11, 1st Meeting [Online] 2010, pp. 1-41.
Karczewicz et al., "Video Coding Technology Proposal by Qualcomm Inc." (JCTVC-A121) Joint Collaborative Team on Video Coding (JCT-VC) of ITU-T SG16 WP3 and ISO/IECJTC1/SC29/WG11, 1st Meeting [Online] 2010, pp. 1-24.
"Series H: Audiovisual and Multimedia Systems, Infrastructure of audiovisual services—Coding of moving video," ITU-T Standard H.264, Mar. 2005, 343 pp.

* cited by examiner

*Primary Examiner* — Anner Holder
(74) *Attorney, Agent, or Firm* — Todd E. Marlette

(57) ABSTRACT

A video block syntax element indicates whether all of the partitions of a video block are predicted based on a same reference list and no greater than quarter-pixel accuracy is used. If the video block syntax element is set, partition-level signaling of the reference lists is avoided. If the video block syntax element is not set, partition-level signaling of the reference lists occurs. If the video block syntax element is set, partition-level syntax elements may be used for each of the partitions of the video block, wherein the partition-level syntax elements each identify one of the reference lists and motion vector accuracy for a given one of the partitions.

43 Claims, 6 Drawing Sheets

BLOCK AND PARTITION SIGNALING TECHNIQUES FOR VIDEO CODING

This application claims the benefit of U.S. Provisional Application No. 61/323,257, filed on Apr. 12, 2010, the entire content of which is incorporated herein by reference.

TECHNICAL FIELD

This disclosure relates to block-based video coding techniques used to compress video data and, more particularly, the coding of syntax information for video blocks and partitions of video blocks.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, tablet computers, digital cameras, digital recording devices, video gaming devices, video game consoles, personal multimedia players, and the like. Such video devices may implement video compression techniques, such as those described in MPEG-2, MPEG-4, or ITU-T H.264/MPEG-4, Part 10, Advanced Video Coding (AVC), in order compress video data. Video compression techniques perform spatial and temporal prediction to reduce or remove redundancy inherent in video sequences. New standards, such as the ITU-T H.265 standard, continue to emerge and evolve.

Many video coding standards and techniques use block-based video coding. Block-based video coding techniques divide the video data of a video frame (or portion thereof) into video blocks and then encode the video blocks using block-based compression techniques. The video blocks may be further divided into video block partitions. The video blocks (or partitions thereof) are encoded using one or more video-specific encoding techniques as well as general data compression techniques. Video encoding often includes motion estimation, motion compensation, transform coding such as discrete cosine transforms (DCT), quantization, and variable length coding. Syntax information is often signaled with encoded video data, e.g., often in a video frame header or video block header, in order to inform the decoder how to decode the video data.

SUMMARY

This disclosure describes techniques for generating syntax elements at a video encoder during a video encoding process, and techniques for using the syntax elements at a video decoder during a video decoding process. The techniques of this disclosure define video block level syntax elements (e.g., macroblock syntax) and partition level syntax elements. In one example, one-bit of syntax information, referred to below as a "mv_mode_uniform_flag" may be sent with a video block to indicate whether each partition of the video block is predicted based on a same reference list of predictive data and no greater than quarter-pixel accuracy is used. The reference list refers to the predictive data used in motion estimation and motion compensation, and typically comprises a previous or subsequent frame (or a portion or slice of a previous or subsequent frame).

According to this disclosure, if mv_mode_uniform_flag is set (e.g., has a value of one), then this indicates that all of the partitions of the video block are predicted based on a particular reference list (referred to as ref_index 0) and all partitions use quarter-pixel accuracy in the predictions. The reference list "ref_index 0" typically identifies the most temporally adjacent predictive data (i.e., the closest temporal predictive data) that may be used in the motion estimation and motion compensation.

If mv_mode_uniform_flag is not set (e.g., has a value of zero), then partition level syntax elements (referred to herein as "mv_mode") are generated and sent with the encoded bitstream for each partition. The syntax element mv_mode for each partition may comprise a variable length code (VLC). The syntax element mv_mode identifies, for each partition, whether motion vector accuracy is allowed to quarter-pixel precision or one-eighth-pixel precision (which may only be allowed for predictions from ref_index 0). The syntax element mv_mode also identifies the reference index used for that partition, e.g., ref_index 0, ref_index 1, ref_index 2, and so forth. Additional signaling (such as for signaling so-called "skipped" blocks) is also contemplated by this disclosure.

In one example, this disclosure describes a method of encoding a video block that includes a plurality of partitions that are predicted from one or more reference lists. The method comprises performing block-based prediction of the partitions of the video block, and generating a video block syntax element for the video block to indicate whether all of the partitions of the video block are predicted based on a same one of the reference lists and no greater than quarter-pixel accuracy is used. If the video block syntax element indicates that all of the partitions of the video block are predicted based on the same one of the reference lists and no greater than quarter-pixel accuracy is used, partition-level signaling of the reference lists is avoided. If the video block syntax element does not indicate that all of the partitions of the video block are predicted based on the same one of the reference lists and no greater than quarter-pixel accuracy is used, partition-level signaling of the reference lists occurs. If the video block syntax element does not indicate that all of the partitions of the video block are predicted based on the same one of the reference lists and no greater than quarter-pixel accuracy is used, the method also includes generating partition-level syntax elements for each of the partitions of the video block, wherein the partition-level syntax elements each identify one of the reference lists and motion vector accuracy for a given one of the partitions.

In another example, this disclosure describes a method of decoding a video block that includes a plurality of partitions that are predicted from one or more reference lists. The method comprises receiving a video block syntax element with the video block to indicate whether all of the partitions of the video block are predicted based on a same one of the reference lists and no greater than quarter-pixel accuracy is used. If the video block syntax element indicates that all of the partitions of the video block are predicted based on the same one of the reference lists and no greater than quarter-pixel accuracy is used, partition-level signaling of the reference lists is avoided. If the video block syntax element does not indicate that all of the partitions of the video block are predicted based on the same one of the reference lists and no greater than quarter-pixel accuracy is used, partition-level signaling of the reference lists occurs. If the video block syntax element does not indicate that all of the partitions of the video block are predicted based on the same one of the reference lists and no greater than quarter-pixel accuracy is used, the method further includes receiving partition-level syntax elements for each of the partitions of the video block, wherein the partition-level syntax elements each identify one or more of the reference lists and motion vector accuracy for a given one of the partitions. In addition, the method includes decoding the video block based on the video block syntax element and the partition-level syntax elements.

In another example, this disclosure describes an apparatus that encodes video data. The apparatus comprises a prediction unit that encodes a video block that includes a plurality of partitions that are predicted from one or more reference lists, wherein the prediction unit performs block-based prediction of the partitions of the video block. The apparatus also comprise a syntax generator that generates a video block syntax element for the video block to indicate whether all of the partitions of the video block are predicted based on a same one of the reference lists and no greater than quarter-pixel accuracy is used. If the video block syntax element indicates that all of the partitions of the video block are predicted based on the same one of the reference lists and no greater than quarter-pixel accuracy is used, partition-level signaling of the reference lists is avoided. If the video block syntax element does not indicate that all of the partitions of the video block are predicted based on the same one of the reference lists and no greater than quarter-pixel accuracy is used, partition-level signaling of the reference lists occurs. If the video block syntax element does not indicate that all of the partitions of the video block are predicted based on the same one of the reference lists and no greater than quarter-pixel accuracy is used, the syntax generator generates partition-level syntax elements for each of the partitions of the video block, wherein the partition-level syntax elements each identify one of the reference lists and motion vector accuracy for a given one of the partitions.

In another example, this disclosure describes an apparatus that decodes a video block that includes a plurality of partitions that are predicted from one or more reference lists. The apparatus comprises a prediction unit that receives and decodes the video block, and a syntax decode unit that receives a video block syntax element to indicate whether all of the partitions of the video block are predicted based on a same one of the reference lists. If the video block syntax element indicates that all of the partitions of the video block are predicted based on the same one of the reference lists and no greater than quarter-pixel accuracy is used, partition-level signaling of the reference lists is avoided. If the video block syntax element does not indicate that all of the partitions of the video block are predicted based on the same one of the reference lists and no greater than quarter-pixel accuracy is used, partition-level signaling of the reference lists occurs. If the video block syntax element does not indicate that all of the partitions of the video block are predicted based on the same one of the reference lists and no greater than quarter-pixel accuracy is used, the syntax decode unit receives partition-level syntax elements for each of the partitions of the video block, wherein the partition-level syntax elements each identify one of the reference lists and motion vector accuracy for a given one of the partitions. The prediction unit decodes the video block based on the video block syntax element and the partition-level syntax elements.

In another example, this disclosure describes a device that encodes a video block that includes a plurality of partitions that are predicted from one or more reference lists. The device comprises means for performing block-based prediction of the partitions of the video block, and means for generating a video block syntax element for the video block to indicate whether all of the partitions of the video block are predicted based on a same one of the reference lists and no greater than quarter-pixel accuracy is used. If the video block syntax element indicates that all of the partitions of the video block are predicted based on the same one of the reference lists and no greater than quarter-pixel accuracy is used, partition-level signaling of the reference lists is avoided. If the video block syntax element does not indicate that all of the partitions of the video block are predicted based on the same one of the reference lists and no greater than quarter-pixel accuracy is used, partition-level signaling of the reference lists occurs. If the video block syntax element does not indicate that all of the partitions of the video block are predicted based on the same one of the reference lists and no greater than quarter-pixel accuracy is used, the device further comprises means for generating partition-level syntax elements for each of the partitions of the video block, wherein the partition-level syntax elements each identify one of the reference lists and motion vector accuracy for a given one of the partitions.

In another example, this disclosure describes a device that decodes a video block that includes a plurality of partitions that are predicted from one or more reference lists. The device comprises means for receiving a video block syntax element with the video block to indicate whether all of the partitions of the video block are predicted based on a same one of the reference lists and no greater than quarter-pixel accuracy is used, wherein if the video block syntax element indicates that all of the partitions of the video block are predicted based on the same one of the reference lists and no greater than quarter-pixel accuracy is used, partition-level signaling of the reference lists is avoided, and wherein if the video block syntax element does not indicate that all of the partitions of the video block are predicted based on the same one of the reference lists and no greater than quarter-pixel accuracy is used, partition-level signaling of the reference lists occurs. If the video block syntax element does not indicate that all of the partitions of the video block are predicted based on the same one of the reference lists and no greater than quarter-pixel accuracy is used, the device further comprises means for receiving partition-level syntax elements for each of the partitions of the video block, wherein the partition-level syntax elements each identify one or more of the reference lists and motion vector accuracy for a given one of the partitions. The device further comprises means for decoding the video block based on the video block syntax element and the partition-level syntax elements.

The techniques described in this disclosure may be implemented in hardware, software, firmware, or any combination thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium comprising instructions that upon execution in a processor, cause the processor to encode a video block that includes a plurality of partitions that are predicted from one or more reference lists. The instructions cause the processor to perform block-based prediction of the partitions of the video block, and generate a video block syntax element for the video block to indicate whether all of the partitions of the video block are predicted based on a same one of the reference lists and no greater than quarter-pixel accuracy is used. If the video block syntax element indicates that all of the partitions of the video block are predicted based on the same one of the reference lists and no greater than quarter-pixel accuracy is used, partition-level signaling of the reference lists is avoided. If the video block syntax element does not indicate that all of the partitions of the video block are predicted based on the same one of the reference lists and no greater than quarter-pixel accuracy is used, partition-level signaling of the reference lists occurs. If the video block syntax element does not indicate that all of the partitions of the video block are predicted based on the same one of the reference lists and no greater than quarter-pixel accuracy is used, the instructions cause the processor to generate partition-level syntax elements for each of the partitions of the video block, wherein the partition-level syntax elements each identify one of the reference lists and motion vector accuracy for a given one of the partitions.

In addition, this disclosure also contemplates a computer-readable storage medium comprising instructions that upon execution in a processor, cause the processor to decode a video block that includes a plurality of partitions that are predicted from one or more reference lists. In this case, the instructions cause the processor to interpret a video block syntax element received with the video block to determine whether all of the partitions of the video block are predicted based on a same one of the reference lists and no greater than quarter-pixel accuracy is used, wherein if the video block syntax element indicates that all of the partitions of the video block are predicted based on the same one of the reference lists and no greater than quarter-pixel accuracy is used, partition-level signaling of the reference lists is avoided, and wherein if the video block syntax element does not indicate that all of the partitions of the video block are predicted based on the same one of the reference lists and no greater than quarter-pixel accuracy is used, partition-level signaling of the reference lists occurs. If the video block syntax element does not indicate that all of the partitions of the video block are predicted based on the same one of the reference lists and no greater than quarter-pixel accuracy is used, the instructions cause the processor to interpret partition-level syntax elements for each of the partitions of the video block, wherein the partition-level syntax elements each identify one or more of the reference lists and motion vector accuracy for a given one of the partitions. The instructions also cause the processor to decode the video block based on the video block syntax element and the partition-level syntax elements.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
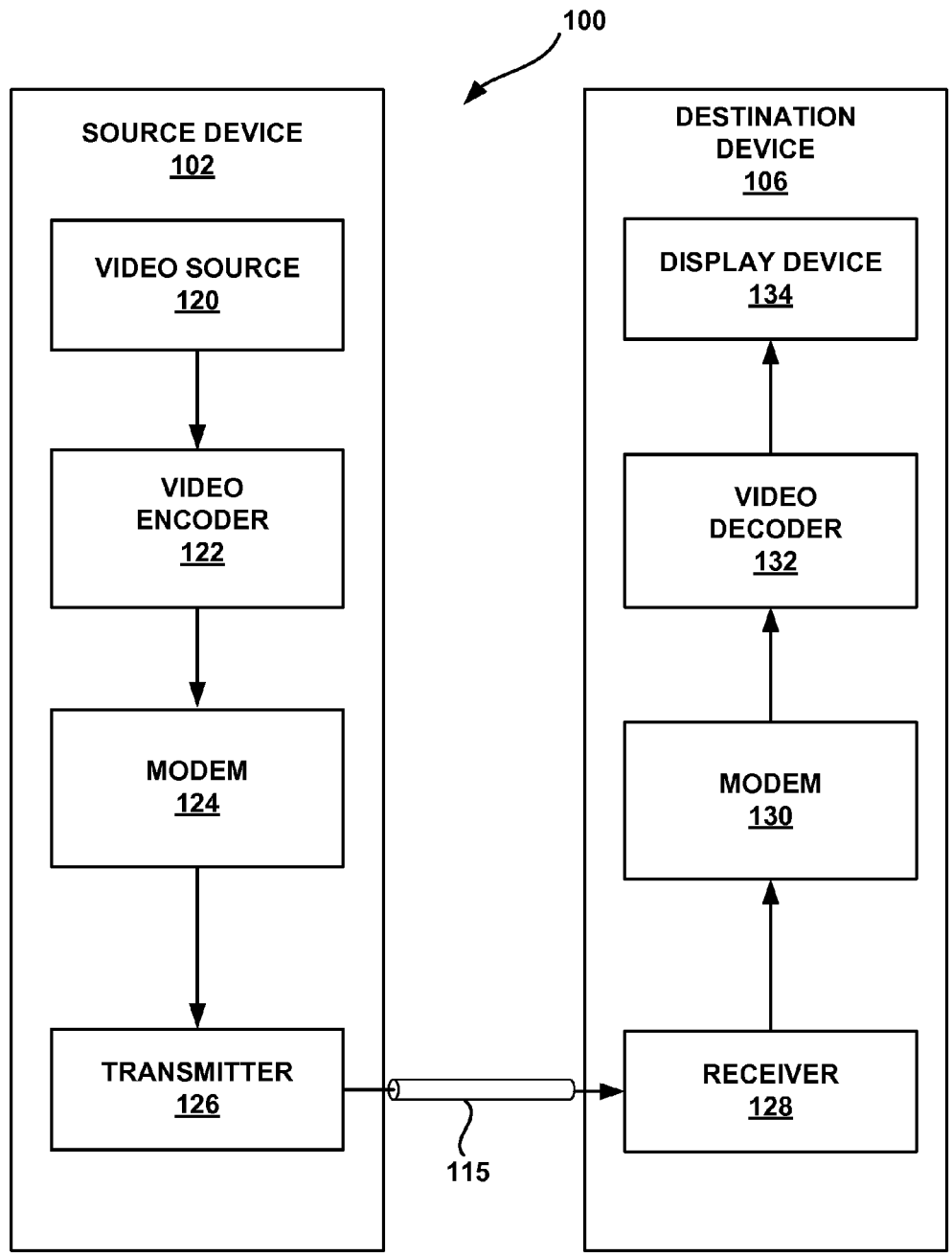
FIG. 1 is a block diagram illustrating a video encoding and decoding system that may implement one or more of the techniques of this disclosure.

This disclosure relates to the encoding and decoding of video data. Block-based video coding standards, such as ITU-T H.264, break video data into video blocks and then encode the video blocks using compression techniques. The video blocks are encoded using one or more video-specific encoding techniques as well as general data compression techniques. Video encoding often includes motion estimation, motion compensation, transform coding such as discrete cosign transforms (DCT), quantization, and entropy coding.

As new standards emerge, such as ITU-T H.265, larger block sizes may be allowed. Furthermore, block-based predictions may be allowed to predict video data based on interpolated reference data at more refined fractional precision than that used in previous standards. Motion vectors to one-eighth pixel accuracy, for example, may be allowed in ITU-T H.265, whereas ITU-T H.264 only allowed one-quarter pixel accuracy. This disclosure describes syntax elements that may be used to signal and control signaling of reference list indexes in combination with motion vector accuracy that is allowed for video blocks and partitions. Video block partition signaling is also described.

Specifically, this disclosure defines video block level syntax elements (e.g., macroblock syntax) and partition level syntax elements. In one example, one-bit of syntax information, referred to below as a "mv_mode_uniform_flag" may be generated at an encoder and sent with a video block to indicate whether each partition of the video block is predicted based on a same reference list and no greater than quarter-pixel accuracy is used. The reference list refers to the predictive data used in motion estimation and motion compensation, and typically comprises a previous or subsequent frame (or a portion or slice of a previous or subsequent frame).

According to this disclosure, if mv_mode_uniform_flag is set (e.g., has a value of one), then this indicates that all of the partitions of the video block are predicted based on a particular reference list (referred to as ref_index 0) and all partitions use quarter-pixel accuracy in the predictions. The reference list "ref_index 0" typically identifies the most temporally adjacent predictive data that may be used in the motion estimation and motion compensation.

If mv_mode_uniform_flag is not set (e.g., has a value of zero), then partition level syntax elements (referred to herein as "mv_mode") are generated and sent with the encoded bitstream for each partition. The syntax element mv_mode may comprise a variable length code (VLC) for each partition. The syntax element mv_mode identifies, for each partition, whether motion vector accuracy is allowed to quarter-pixel precision or one-eighth-pixel precision (which may only be allowed for predictions from ref_index 0). The syntax element mv_mode also identifies the reference list used for that partition, e.g., ref_index 0, ref_index 1, ref_index 2, and so forth.

Additionally, other types of signaling are also contemplated by this disclosure. In particular, this disclosure contemplates the generation and communication of skip syntax elements for an encoded bitstream to indicate:

1) whether the video block is a 64 by 64 skipped block, 2) if the video block is not a 64 by 64 skipped block, whether any of four 32 by 32 blocks in a 6 by 64 block are skipped blocks, and 3) if any of the 32 by 32 blocks not are skipped blocks, whether any of four 16 by 16 blocks in a 32 by 32 block are skipped blocks.

In this disclosure, the term "coding" refers to encoding or decoding. Similarly, the term "coder" generally refers to any video encoder, video decoder, or combined encoder/decoder (codec). Accordingly, the term "coder" is used herein to refer to a specialized computer device or apparatus that performs video encoding or video decoding. The signaling techniques of this disclosure may be applicable to encoders or decoders. The encoder generates the syntax elements, and the decoder receives the syntax elements and interprets the syntax elements in decoding a video block.

FIG. 1 is a block diagram illustrating an exemplary video encoding and decoding system 100 that may implement techniques of this disclosure. As shown in FIG. 1, system 100 includes a source device 102 that transmits encoded video to a destination device 106 via a communication channel 115. Source device 102 and destination device 106 may comprise any of a wide range of devices. In some cases, source device 102 and destination device 106 may comprise wireless communication device handsets, such as so-called cellular or satellite radiotelephones. The techniques of this disclosure, however, which apply generally to the encoding and decoding video blocks, are not necessarily limited to wireless applications or settings, and may be applied to a wide variety of non-wireless devices that include video encoding and/or decoding capabilities.

In the example of FIG. 1, source device 102 may include a video source 120, a video encoder 122, a modulator/demodulator (modem) 124 and a transmitter 126. Destination device 106 may include a receiver 128, a modem 130, a video decoder 132, and a display device 134. In accordance with this disclosure, video encoder 122 of source device 102 may be configured to generate video block syntax elements and partition-level syntax elements during the encoding process. In particular, consistent with the techniques described herein, video encoder 122 may generate a video block syntax element for the video block to indicate whether all of the partitions of the video block are predicted based on a same reference list of predictive data and no greater than quarter-pixel accuracy is used. The video block may comprise a so-called macroblock, and the partitions may comprise smaller blocks of data that collectively define the entire macroblock.

If the video block syntax element indicates that all of the partitions of the video block are predicted based on the same one of the reference lists and no greater than quarter-pixel accuracy is used, partition-level signaling of the reference lists is avoided. If the video block syntax element does not indicate that all of the partitions of the video block are predicted based on the same one of the reference lists and no greater than quarter-pixel accuracy is used, partition-level signaling of the reference lists occurs. Details on quarter-pixel accuracy relative to one-eighth-pixel accuracy are explained below. If the video block syntax element does not indicate that all of the partitions of the video block are predicted based on the same one of the reference lists and no greater than quarter-pixel accuracy is used, video encoder 122 may generate partition-level syntax elements for each of the partitions of the video block, wherein the partition-level syntax elements each identify one of the reference lists and motion vector accuracy for a given one of the partitions.

Reciprocal decoding may also be performed by video decoder 132 of destination device 106. That is, video decoder 132 may also be configured to decode a video block based on the syntax elements sent by video encoder 122. In particular, video decoder 132 may interpret the syntax elements in the bitstream, and perform decoding steps based on the syntax elements. More specifically, according to this disclosure, video decoder 132 may receive a video block syntax element with the video block to indicate whether all of the partitions of the video block are predicted based on a same one of the reference lists and no greater than quarter-pixel accuracy is used. If the video block syntax element indicates that all of the partitions of the video block are predicted based on the same one of the reference lists and no greater than quarter-pixel accuracy is used, partition-level signaling of the reference lists is avoided, and If the video block syntax element does not indicate that all of the partitions of the video block are predicted based on the same one of the reference lists and no greater than quarter-pixel accuracy is used, partition-level signaling of the reference lists occurs. If the video block syntax element does not indicate that all of the partitions of the video block are predicted based on the same one of the reference lists and no greater than quarter-pixel accuracy is used, video decoder 132 may receive partition-level syntax elements for each of the partitions of the video block, wherein the partition-level syntax elements each identify one or more of the reference lists and motion vector accuracy for a given one of the partitions. Video decoder 132 may then decode the video block based on the video block syntax element and the partition-level syntax elements.

The illustrated system 100 of FIG. 1 is merely exemplary. The encoding and decoding techniques of this disclosure may be performed by any encoding or decoding devices. Source device 102 and destination device 106 are merely examples of coding devices that can support such techniques.

Video encoder 122 of source device 102 may encode video data received from video source 120. Video source 120 may comprise a video capture device, such as a video camera, a video archive containing previously captured video, or a video feed from a video content provider. As a further alternative, video source 120 may generate computer graphics-based data as the source video, or a combination of live video, archived video, and computer-generated video. In some cases, if video source 120 is a video camera, source device 102 and destination device 106 may form so-called camera phones or video phones. In each case, the captured, pre-captured or computer-generated video may be encoded by video encoder 122.

In system 100, once the video data is encoded by video encoder 122, the encoded video information may then be modulated by modem 124 according to a communication standard, e.g., such as code division multiple access (CDMA) or any other communication standard or technique, and transmitted to destination device 106 via transmitter 126. Modem 124 may include various mixers, filters, amplifiers or other components designed for signal modulation. Transmitter 126 may include circuits designed for transmitting data, including amplifiers, filters, and one or more antennas. Receiver 128 of destination device 106 receives information over channel 115, and modem 130 demodulates the information. Again, the video decoding process performed by video decoder 132 may include similar (i.e., reciprocal) decoding techniques to the encoding techniques performed by video encoder 122.

Communication channel 115 may comprise any wireless or wired communication medium, such as a radio frequency (RF) spectrum or one or more physical transmission lines, or any combination of wireless and wired media. Communication channel 115 may form part of a packet-based network, such as a local area network, a wide-area network, or a global network such as the Internet. Communication channel 115 generally represents any suitable communication medium, or a collection of different communication media, for transmitting video data from source device 102 to destination device 106.

Video encoder 122 and video decoder 132 may operate very similar to a video compression standard such as the ITU-T H.264 standard, alternatively referred to as MPEG-4, Part 10, Advanced Video Coding (AVC). However, the techniques and video block sizes applied in the coding process may differ from that defined in ITU-T H.264. Alternatively, video encoder 122 and video decoder 132 may operate according to the emerging ITU-T H.265 standard, which may support different sizes of transforms in the coding process. In addition, the ITU-T H.265 standard may allow for interpolations during predictive coding to finer resolutions than those allowed in ITU-T H.264, such as one-eighth-pixel precision. In general, the techniques of this disclosure may be readily applied in the context of a variety of other video coding standards.

Although not shown in FIG. 1, in some aspects, video encoder 122 and video decoder 132 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 122 and video decoder 132 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 122 and video decoder 132 may be included in one or more encoders or decoders, either of which may be integrated as part of a combined encoder/decoder (CODEC) in a respective mobile device, subscriber device, broadcast device, server, or the like.

In some cases, devices 102, 106 may operate in a substantially symmetrical manner. For example, each of devices 102, 106 may include video encoding and decoding components. Hence, system 100 may support one-way or two-way video transmission between video devices 102, 106, e.g., for video streaming, video playback, video broadcasting, or video telephony.

During the encoding process, video encoder 122 may execute a number of coding techniques or operations. In general, video encoder 122 operates on video blocks within individual video frames (or other independently coded units such as slices) in order to encode the video blocks. Frames, slices, portions of frames, groups of pictures, or other data structures may be defined as independently decodable units that include a plurality of video blocks. The video blocks within coded units may have fixed or varying sizes, and may differ in size according to a specified coding standard. In some cases, each video frame may include a series of independently decodable slices, and each slice may include a series of macroblocks, which may be arranged into even smaller blocks.

Macroblocks typically refer to 16 by 16 blocks of data, which may be divided into smaller partitions. However, macroblocks may refer to larger blocks, such as 64 by 64 blocks, which may be partitioned. The ITU-T H.264 standard, as one example, supports intra prediction in various partition block sizes, such as 16 by 16, 8 by 8, or 4 by 4 for luma components, and 8 by 8 for chroma components, as well as inter prediction in various partition block sizes, such as 16 by 16, 16 by 8, 8 by 16, 8 by 8, 8 by 4, 4 by 8 and 4 by 4 for luma components and corresponding scaled sizes for chroma components. The ITU-T H.265 standard may support these or other block sizes, such as 64 by 64 blocks mentioned above. In this disclosure, the phrase "video blocks" refers to any size of video block, and the term "partitions" refers to blocks of data that comprise some or all of a given video block. Video blocks or partitions of a video block may refer to blocks of video data in the pixel domain, or blocks of data in a transform domain such as a discrete cosine transform (DCT) domain, a domain similar to DCT, a wavelet domain, or the like. The phrase "video block" may be used to refer to a partition of a video block in the description of block-based coding techniques herein. A partition, however, is itself either a video block or smaller block-portion thereof.

Referring again to FIG. 1, video encoder 122 may perform predictive coding in which a video block (or partition) being coded is compared to a predictive frame (or other coded unit) in order to identify a predictive block. This process of predictive coding is often referred to as motion estimation and motion compensation. Motion estimation estimates video block motion relative to one or more predictive video blocks of one or more predictive frames (or other coded units). Motion compensation generates the desired predictive video block from the one or more predictive frames or other coded units. Motion compensation may include an interpolation process in which interpolation filtering is performed to generate predictive data at fractional pixel precision.

After generating the predictive block, the differences between the pixels of the current video block (or partition) being coded and the corresponding pixels of the predictive block are coded as a residual block, and prediction syntax (such as a motion vector) is used to identify the predictive block. The residual block may be transformed and quantized. Transform techniques may comprise a DCT process or conceptually similar process, integer transforms, wavelet transforms, or other types of transforms. In a DCT or DCT-like process, as an example, the transform process converts a set of pixel values (e.g., residual values) into transform coefficients, which may represent the energy of the pixel values in the frequency domain. Quantization is typically applied on the transform coefficients, and generally involves a process that limits the number of bits associated with any given transform coefficient.

In accordance with some newer coding standards, such as ITU-T H.265, different sized blocks, different sizes of transforms, as well as finer resolutions of interpolations during prediction may be supported. In ITU-T H.264, any transforms are 8 by 8 transforms. With ITU-T H.265 and other standards, many conventional constraints on transform sizes may be eliminated. Also, in ITU-T H.264, interpolation of predictive data may occur only to quarter-pixel resolution, while ITU-T H.265 and other standards may allow finer resolution in the interpolations, such as to one-eighth level precision. The signaling techniques of this disclosure may be particularly useful for standards that allow interpolations of predictive data to one-eighth level precision.

Following transform and quantization, entropy coding may be performed on the quantized and transformed residual video blocks. Syntax elements, such as those described herein, various filter syntax information, and prediction vectors defined during the encoding, may also be included in the entropy coded bitstream. In general, entropy coding comprises one or more processes that collectively compress a sequence of quantized transform coefficients and/or other syntax information. Scanning techniques, such as zig-zag scanning techniques, are performed on the quantized transform coefficients in order to define one or more serialized one-dimensional vectors of coefficients from two-dimensional video blocks. The scanned coefficients are then entropy coded along with any syntax information, e.g., via content adaptive variable length coding (CAVLC), context adaptive binary arithmetic coding (CABAC), or another entropy coding process.

As part of the encoding process, encoded video blocks may be decoded to generate the video data used for subsequent prediction-based coding of subsequent video blocks. At this stage of the encoding or decoding process, filtering may be employed in order to improve video quality, and e.g., remove blockiness or other artifacts from decoded video. This filtering may be in-loop or post-loop. With in-loop filtering, the filtering of reconstructed video data occurs in the coding loop, which means that the filtered data is stored by an encoder or a decoder for subsequent use in the prediction of subsequent image data. In contrast, with post-loop filtering, the filtering of reconstructed video data occurs out of the coding loop, which means that unfiltered versions of the data are stored by an encoder or a decoder for subsequent use in the prediction of subsequent image data.

Figure 2:
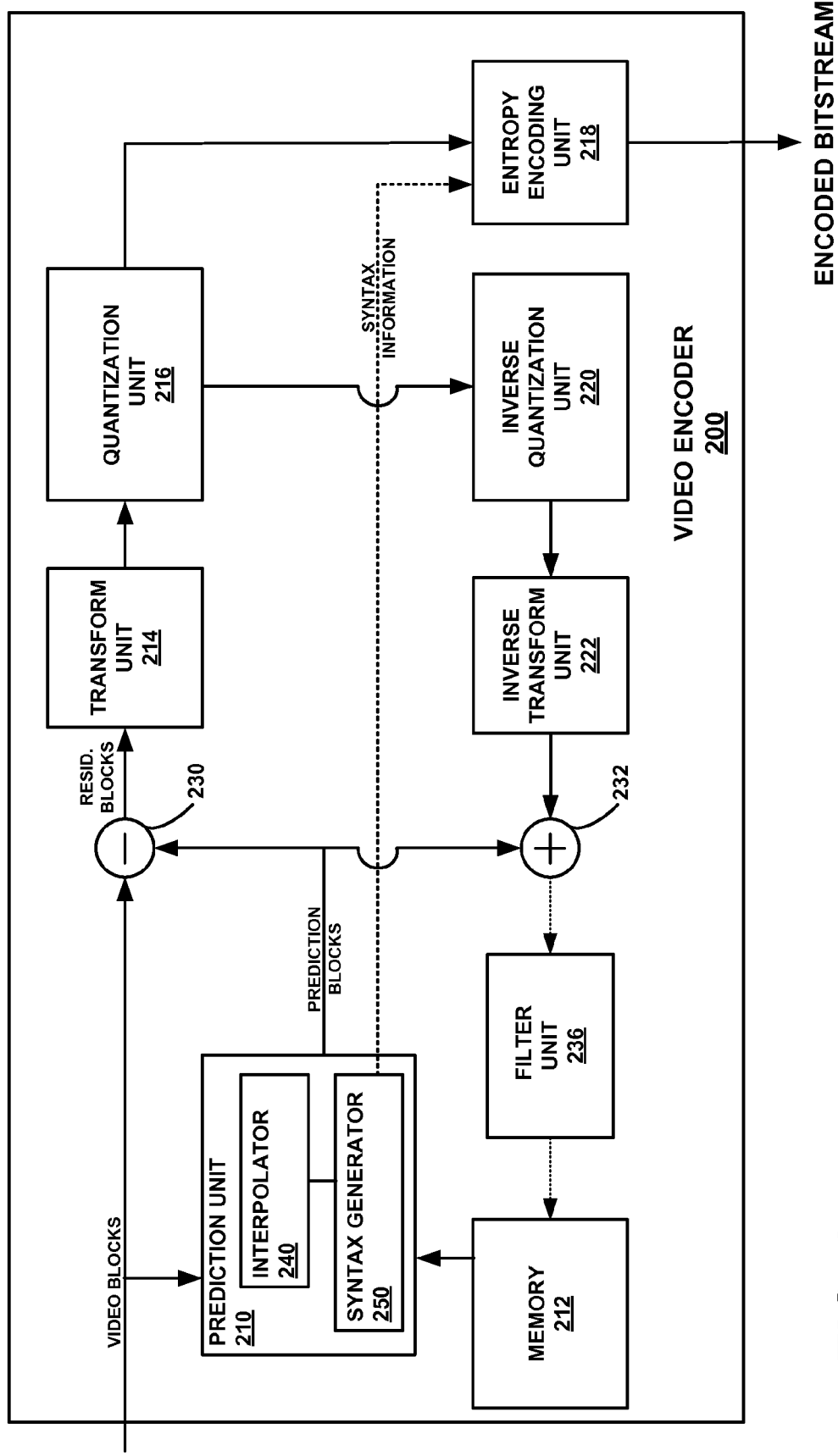
FIG. 2 is a block diagram illustrating an exemplary video encoder that may implement one or more techniques of this disclosure.

FIG. 2 is a block diagram illustrating an example video encoder 200 consistent with this disclosure. Video encoder 200 may correspond to video encoder 122 of source device 102, or a video encoder of a different device. As shown in FIG. 2, video encoder 200 includes a prediction unit 210, adders 230 and 232, and a memory 212. Video encoder 200 also includes a transform unit 214 and a quantization unit 216, as well as an inverse quantization unit 220 and an inverse transform unit 222. Filter unit 236 may perform in-loop or post-loop filtering on reconstructed video blocks.

Prediction unit 210 may perform the techniques of this disclosure in generating syntax information. Prediction unit 210 may include an interpolator 240 that interpolates predictive data to fractional precision based on integer pixel values stored in memory 212. Syntax generator 250 generates syntax information consistent with that described herein, and may base the generated syntax information on the precision of interpolations performed by interpolator 240 and the reference list (or lists) of data used by prediction unit 210 in performing prediction. Such reference lists may be stored in memory 212.

During the encoding process, video encoder 200 receives a video block to be coded, and prediction unit 210 performs predictive coding techniques. For inter coding, prediction unit 210 compares the video block to be encoded to various blocks in one or more video reference frames or slices in order to define a predictive block. For intra coding, prediction unit 210 generates a predictive block based on neighboring data within the same coded unit. Prediction unit 210 outputs the prediction block and adder 230 subtracts the prediction block from the video block being coded in order to generate a residual block.

For inter coding, prediction unit 210 may comprise motion estimation and motion compensation units that identify a motion vector that points to a prediction block and generates the prediction block based on the motion vector. Typically, motion estimation is considered the process of generating the motion vector, which estimates motion. For example, the motion vector may indicate the displacement of a predictive block within a predictive frame relative to the current block being coded within the current frame. Motion compensation is typically considered the process of fetching or generating the predictive block based on the motion vector determined by motion estimation. For intra coding, prediction unit 210 generates a predictive block based on neighboring data within the same coded unit. One or more intra-prediction modes may define how an intra prediction block can be defined.

Motion compensation for inter-coding may include interpolations to sub-pixel resolution. Interpolator 240 may perform such interpolations based on integer pixel values stored in memory 212 in order to allow motion prediction to sub-pixel resolutions. Interpolated predictive data generated by interpolator 240, for example, may be interpolated to half-pixel resolution, quarter-pixel resolution, one-eighth-pixel resolution, or even finer resolution. This permits motion estimation to estimate motion of video blocks to such sub-pixel resolution. Syntax generator 250 generates syntax information consistent with that described herein, and may base the generated syntax information on the precision of interpolations performed by interpolator 240 and the reference list (or lists) of data used by prediction unit 210 in performing prediction.

The reference list (or lists) of data used by prediction unit 210 in performing prediction are stored in memory 212 and generally comprise reconstructed previous or subsequent frames or slices of video data (or portions thereof). Memory 212, for example, may include a first list (ref_index 0), a second list (ref_index 1), a third list (ref_index 2), and possibly more. The first list (ref_index 0) my comprise data this is temporally closest to the current frame associated with a video block being encoded. In some cases, only the first list (ref_index 0) may be used for pixel interpolations to one-eighth-pixel precision, while other lists may be used for pixel interpolations to one-quarter precision. Some video blocks may be encoded based on one reference list, while other video blocks may be encoded based on data from two different reference lists, possibly using a weighted sum of the predictive data from the two different lists.

After prediction unit 210 outputs the prediction block, and after adder 230 subtracts the prediction block from the video block being coded in order to generate a residual block, transform unit 214 applies a transform to the residual block. The transform may comprise a discrete cosine transform (DCT), an integer transform, or a conceptually similar transform such as that defined by the ITU H.264 standard, or the like. However, unlike the transforms of the ITU H.264 standard, which are fixed size 8 by 8 transforms, transform unit 214 may perform differently sized transforms and may select different sizes of transforms for coding efficiency and improved compression. Wavelet transforms, integer transforms, sub-band transforms or other types of transforms may also be used. In any case, transform unit 214 applies a particular transform to the residual block of residual pixel values, producing a block of residual transform coefficients. The transform may convert the residual pixel value information from a pixel domain to a frequency domain.

Quantization unit 216 then quantizes the residual transform coefficients to further reduce bit rate. Quantization unit 216, for example, may limit the number of bits used to code each of the coefficients. After quantization, entropy coding unit 218 may scan and entropy encode the data. For example, entropy coding unit 218 may scan the quantized coefficient block from a two-dimensional representation to one or more serialized one-dimensional vectors. The scan order may be pre-programmed to occur in a defined order (such as zig-zag scanning or another pre-defined order), or possibly adaptively defined based on previous coding statistics. Following this scanning process, entropy encoding unit 218 encodes the quantized transform coefficients (along with any syntax elements) according to an entropy coding methodology, such as CAVLC or CABAC, to further compress the data. Syntax information included in the entropy coded bitstream may include prediction syntax from prediction unit 210, such as motion vectors for inter coding or prediction modes for intra coding.

Syntax information included in the entropy coded bitstream may also include filter information, such as that applied for interpolations by prediction unit 210 or the filters applied by filter unit 236. In addition, syntax information included in the entropy coded bitstream may also include video block syntax element for each video block that indicates whether all of the partitions of that video block are predicted based on the same one of the reference lists and no greater than quarter-pixel accuracy is used. If the video block syntax element does not indicate that all of the partitions of the video block are predicted based on the same one of the reference lists and no greater than quarter-pixel accuracy is used, the syntax information included in the entropy coded bitstream may further include partition-level syntax elements for each of the partitions of the video block, wherein the partition-level syntax elements each identify one of the reference lists and motion vector accuracy for a given one of the partitions.

CAVLC is one type of entropy coding technique supported by the ITU H.264/MPEG4, AVC standard, which may be applied on a vectorized basis by entropy coding unit 218. CAVLC uses VLC tables (not shown in unit 218) in a manner that effectively compresses serialized "runs" of transform coefficients and/or syntax elements. CABAC is another type of entropy coding technique supported by the ITU H.264/MPEG4, AVC standard, which may be applied on a vectorized basis by entropy coding unit 218. CABAC may involve several stages, including binarization, context model selection, and binary arithmetic coding. In this case, entropy coding unit 218 codes transform coefficients and syntax elements according to CABAC. Many other types of entropy coding techniques also exist, and new entropy coding techniques will likely emerge in the future. This disclosure is not limited to any specific entropy coding technique.

Following the entropy coding by entropy encoding unit 218, the encoded video may be transmitted to another device or archived for later transmission or retrieval. Again, the encoded video may comprise the entropy coded vectors and various syntax, which can be used by the decoder to properly configure the decoding process. Inverse quantization unit 220 and inverse transform unit 222 apply inverse quantization and inverse transform, respectively, to reconstruct the residual block in the pixel domain. Summer 232 adds the reconstructed residual block to the prediction block produced by prediction unit 210 to produce a reconstructed video block for storage in memory 212. Memory 212 may store a frame or slice of blocks for use in motion estimation with respect to blocks of other frames to be encoded. Prior to such storage, however, filter unit 236 may apply filtering to the video block to improve video quality. Such filtering by filter unit 236 may reduce blockiness or other artifacts, and may be adaptive to improve video quality. Moreover, filtering may improve compression by generating predictive video blocks that comprise close matches to video blocks being coded.

Figure 3:
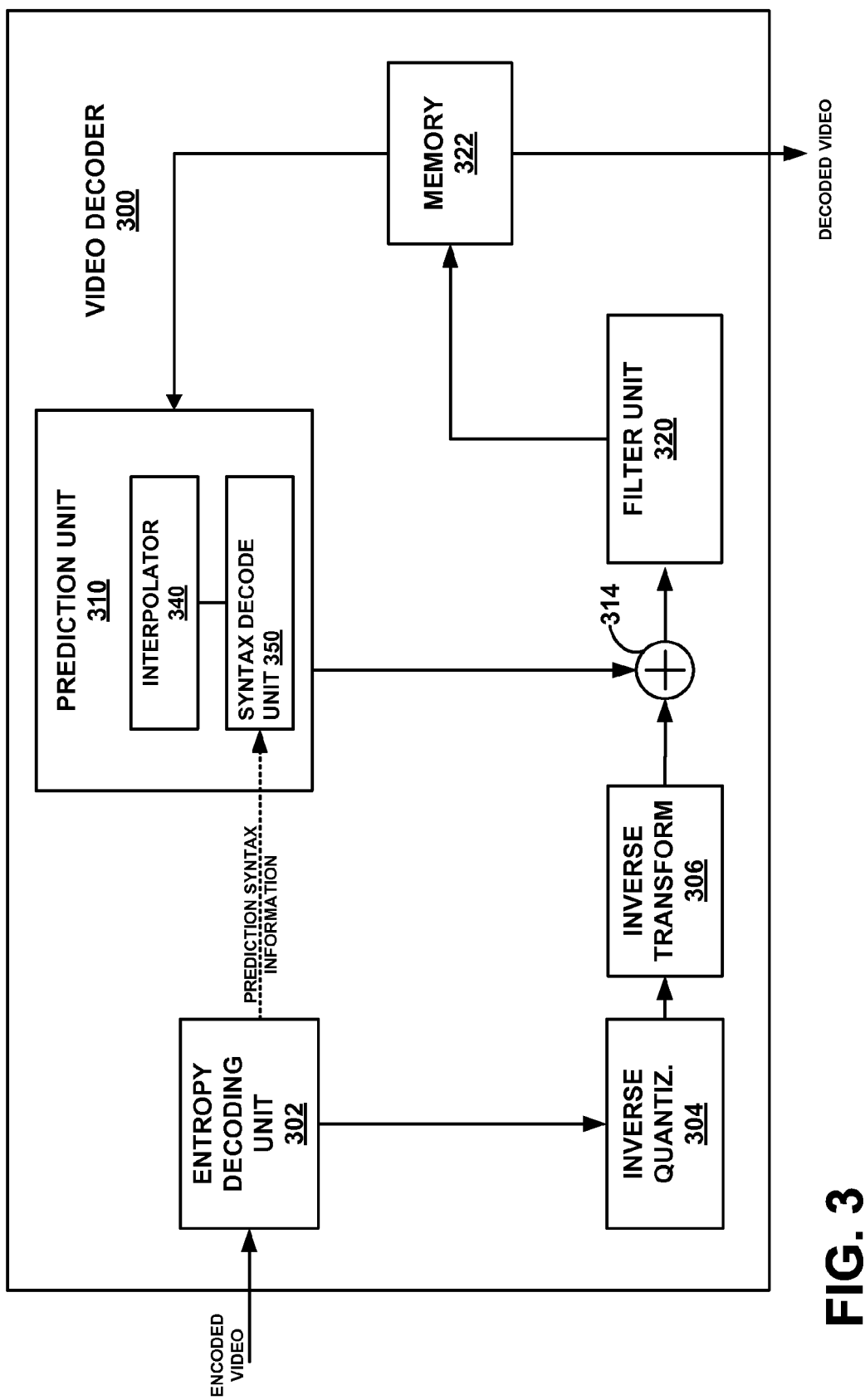
FIG. 3 is a block diagram illustrating an exemplary video decoder that may implement one or more techniques of this disclosure.

FIG. 3 is a block diagram illustrating an example of a video decoder 300, which decodes a video sequence that is encoded in the manner described herein. The received video sequence may comprise an encoded set of image frames, a set of frame slices, a commonly coded group of pictures (GOPs), or a wide variety of coded video units that include encoded video blocks and syntax information to define how to decode such video blocks.

Video decoder 300 includes an entropy decoding unit 302, which performs the reciprocal decoding function of the encoding performed by entropy encoding unit 218 of FIG. 2. In particular, entropy decoding unit 302 may perform CAVLC or CABAC decoding, or decoding according to any other type of reciprocal entropy coding to that applied by entropy encoding unit 218 of FIG. 2. Entropy decoded video blocks in a one-dimensional serialized format may be converted from one or more one-dimensional vectors of coefficients back into a two-dimensional block format. The number and size of the vectors, as well as the scan order defined for the video blocks may define how the two-dimensional block is reconstructed. Entropy decoded prediction syntax information may be sent from entropy decoding unit 302 to prediction unit 310, which may use the syntax information for prediction-based decoding. Syntax decode unit 350 may interpret the syntax information, and based on the syntax information prediction unit 310 may determine which reference list or lists of data to use in memory 322 for predictive decoding. In addition, based on the syntax information interpreted by syntax decode unit 350, prediction unit 310 may invoke interpolator 340 to interpolate predictive data to levels of precision defined by the syntax information.

In addition to prediction unit 310, video decoder 300 also includes an inverse quantization unit 306, an inverse transform unit 304, a memory 322, and a summer 314. In addition, video decoder 300 also includes a filter unit 320, which may represent one or more post loop or in loop filters. The reference list (or lists) of data used by prediction unit 310 in performing prediction are stored in memory 322 and generally comprise reconstructed previous or subsequent frames or slices of video data (or portions thereof). Like memory 212 of video encoder 200, memory 322 of video decoder 300 may include a first list (ref_index 0), a second list (ref_index 1), a third list (ref_index 2), and possibly more. The first list (ref_index 0) may comprise data this is temporally closest to the current frame associated with a video block being decoded. In some cases, only the first list (ref_index 0) may be used for pixel interpolations to one-eighth-pixel precision, while other lists may be used for pixel interpolations to one-quarter precision. Some video blocks may be decoded based on one reference list, while other video blocks may be decoded based on data from two different reference lists, possibly using a weighted sum of the predictive data from the two different lists.

A wide variety of video compression technologies and standards perform spatial and temporal prediction to reduce or remove the redundancy inherent in input video signals. As explained above, an input video block is predicted using spatial prediction (i.e. intra prediction) and/or temporal prediction (i.e. inter prediction or motion estimation). The prediction units described herein may include a mode decision module (not shown) in order to choose a desirable prediction mode for a given input video block. Mode selection may consider a variety of factors such as whether the block is intra or inter coded, the prediction block size and the prediction mode if intra coding is used, and the motion partition size and motion vectors used if inter coding is used.

A prediction block is subtracted from the input video block, and transform and quantization can then be applied on the residual video block as described above. The transforms may have variable sizes according to this disclosure, and interpolations of data may allow for motion vector precision to one-eighth pixel precision. Syntax generator 250 of video encoder 200 may generate syntax information that collectively defines the reference list (or lists) use in the encoding and the level of precision used. Syntax decoder unit 350 of video decoder 300 can interpret this syntax information to ensure that the same reference list (or lists) are use in the decoding and same the level of precision is used. The syntax information may include a video block syntax element (which may be one bit of information), and possibly a partition-level syntax element (which comprise a variable length code) as outlined below.

Figure 4:
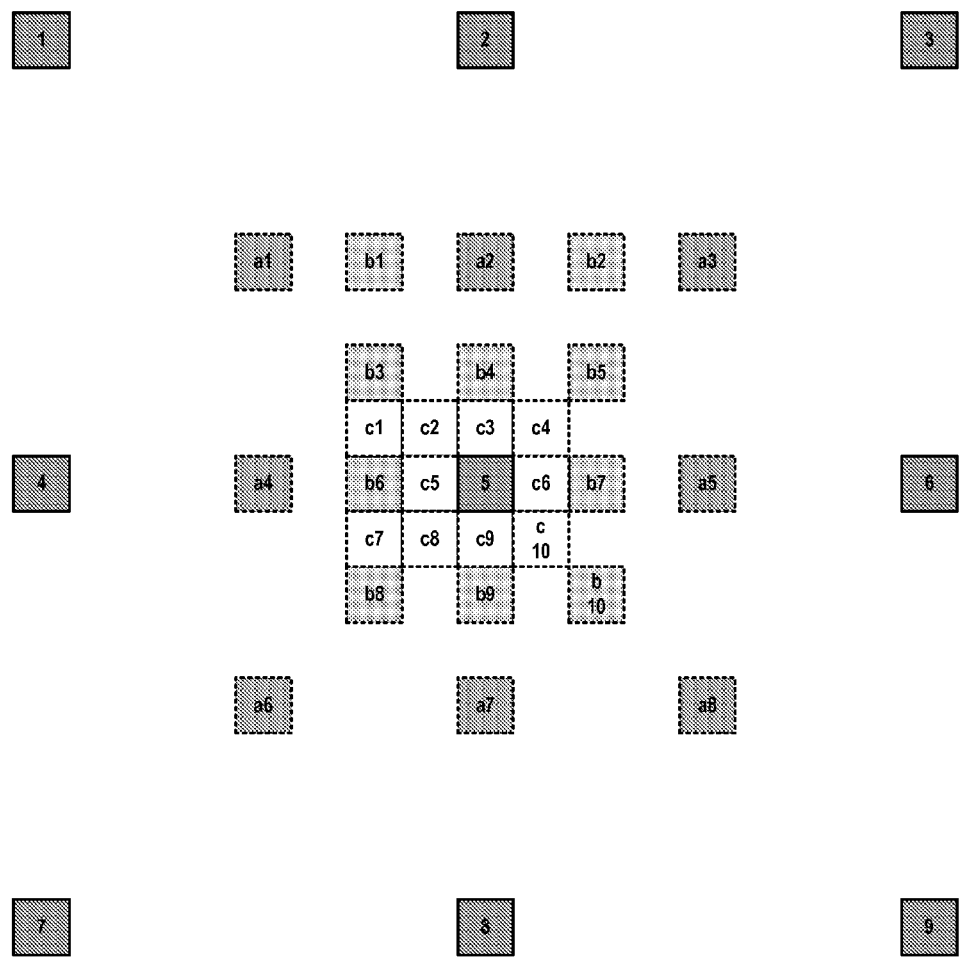
FIG. 4 is a conceptual diagram illustrating the relative position of integer pixels, half-pixels, quarter-pixels, and one-eighth pixels.

FIG. 4 is a conceptual diagram illustrating the relative position of integer pixels, half-pixels, quarter-pixels, and one-eighth pixels. Integer pixels are labeled with numbers (e.g., 1, 2, 3, 4, 5, 6, 7, 8 and 9) and may comprise the integer pixels within a given reference list of predictive data. However, it is often the case that motion vectors to fractional precision yield better predictive matches to a video block being coded. For this reason, interpolations may be performed by filtering the integer pixel values. Half-pixel values (e.g., a1, a2, a3, a4, a5, a6, a7 and a8) may comprise interpolated values corresponding to locations half-way between each of the integer pixels. Quarter-pixel values (e.g., b1, b2, b3, b4, b5, b6, b7, b8, b9 and b10) may comprise interpolated values corresponding to locations half-way between two half-pixels or between a half-pixel and an integer pixel. Quarter pixel values may be interpolated by filtering various half-pixel and integer pixel values to produce the quarter pixel values. One-eighth-pixel values (e.g., c1, c2, c3, c4, c5, c6, c7, c8, c9 and c10) may comprise interpolated values corresponding to locations half-way between two quarter-pixels, between a half-pixel and a quarter pixel, or between an integer pixel and a quarter pixel. One-eighth-pixel values may be generated by filtering various quarter pixel values, half-pixel values, and integer pixel values.

When ⅛-pel (i.e., one-eighth-pixel) accuracy motion vectors are used in the video coding process, if a motion vector points to a reference frame with ref_idx=0, it could be either ¼-pel (i.e., one-quarter-pixel) accuracy or ⅛-pel accuracy. ⅛-pel accuracy may only be allowed for ref_idx=0 and may not be allowed for other reference indexes. In any case, it may be necessary to generate this information as syntax elements at the encoding device, and convey this information within the bitstream to signal how to decode the data at the decoding device. If a motion vector points to any other reference frame, it may be limited to ¼-pel accuracy.

Rather than signaling the reference index and motion vector accuracy separately, the reference index and motion vector accuracy syntax information can be grouped together into one syntax mv_mode. For a block with multiple partitions, each partition may have its own mv_mode. However, to reduce the bits used to signal mv_mode, another syntax element comprising one-bit of information (referred to as "mv_mode_uniform_flag") may be used at the video block level. If all partitions use the same ref_idx 0 and all motion vectors have ¼-pel accuracy, mv_mode_uniform_flag may be set to 1. Otherwise, mv_mode_uniform_flag may be set to 0.

If mv_mode_uniform_flag is to 1, then mv_mode_uniform_flag is not sent for any partitions. However, if mv_mode_uniform_flag is to 0, an mv_mode syntax element may be sent for each partition. Moreover, the mv_mode syntax element may comprise a variable length code. Exponential-Golomb (Exp-Golumb) codes might also be used to signal mv_mode for each partition.

The following table (Table 1) shows one example of variable length codes for mv_mode when the number of reference (num_ref) is equal to 2, 3 and 4. When num_ref is small, Exp-Golomb codes may not be as efficient as the codes shown in Table 1. When the number of reference frames for each slice is known, variable length codes can be used based on num_ref as shown in the following Table 1.

TABLE 1

| mv_mode | | | | | |
|---|---|---|---|---|---|
| | | Motion vector | num_ref | | |
| codeNum | ref_idx | accuracy | 2 | 3 | 4 |
| 0 | 0 | ¼ | 1 | 1 | 1 |
| 1 | 0 | ⅛ | 01 | 01 | 01 |
| 2 | 1 | ¼ | 00 | 001 | 001 |
| 3 | 2 | ¼ | | 000 | 0001 |
| 4 | 3 | ¼ | | | 0000 |

In Table 1, num_ref indicates three different scenarios allowing for 2 reference lists, 3 reference lists or 4 reference lists respectively. Exemplary variable length codes to identify both "ref_idx" and "motion vector accuracy" are shown for each of these three examples of 2 reference lists, 3 reference lists or 4 reference lists. The motion vector accuracy may define the highest level of accuracy allowed for each case. Thus, ¼ accuracy may define motion vector accuracy to no greater than ¼ accuracy.

In this case, if num_ref is equal to or larger than 5, an Exp-Golomb code may be used and the codeNum of ref_idx>0 is equal to ref_idx+1. In such an example, codeNum 0 and 1 may still represent ref_idx 0 with motion vector accuracy ¼ and ⅛, respectively. For any skipped blocks, a skip flag may be set to indicate that the block is a skipped block, in which case the decoder may be configured to generate data for the skipped block, such as via a default protocol that defines collocated data from reference list 0 to correspond to that of skipped blocks. Skipped blocks, however, could be defined by other default protocols, such as based on neighboring intra data or other data from reference lists.

Table 2 sets forth exemplary variable length codes that may be used to signal the size of a given partition within a 64 by 64 macroblock. Table 3 sets forth further exemplary variable length codes that may be used to signal the size of a given partition within a 32 by 32 block partition. Table 4 sets forth further exemplary variable length codes that may be used to signal the size of a given partition of a 16 by 16 block partition.

TABLE 2

| 64 × 64 block partition | Codework |
|---|---|
| 64 × 64 | 01 |
| 64 × 32 | 001 |
| 32 × 64 | 000 |
| 32 × 32 | 1 |

TABLE 3

| 32 × 32 block partition | Codework |
|---|---|
| 32 × 33 | 01 |
| 31 × 16 | 001 |
| 16 × 31 | 000 |
| 16 × 16 | 1 |

TABLE 4

| 16 × 16 block partition | Codework |
|---|---|
| 16 × 16 | 1 |
| 16 × 8 | 000 |
| 8 × 16 | 001 |
| 8 × 8 | 010 |
| Intra mode | 011 |

If a 64 by 64 block is not a skipped block, its partition mode may be signaled according to Table 2. If the 64 by 64 block is partitioned into four 32 by 32 block partitions, for each of the four 32 by 32 block partitions, a flag skip_flag__32 may be sent. If skip_flag__32 is equal to 1, the corresponding 32 by 32 block partition is skipped. Otherwise, it is not skipped, and signaling is defined for the partitions of the 32 by 32 block according to Table 3. Similarly, if a 32 by 32 block partition is partitioned into four 16 by 16 block partitions, for each of four internal 16 by 16 block partitions, a flag skip_flag__16 may be sent. If the skip_flag__16 is equal to 1, the corresponding 16 by 16 block is skipped. Otherwise it is not skipped, and signaling is defined for the partitions of the 16 by 16 block according to Table 4. Of course, the different meanings associated with values of 1 or 0 for any flag could be defined the other way around, consistent with this disclosure.

Thus, for any non-skipped 64 by 64, 32 by 32 and 16 by 16 block partitions, a variable length code can be used to signal the partition modes, as set forth in Tables 2-4. For a 16 by 16 block partition, if the 16 by 16 block partition is coded in 8 by 8 mode, a 1 bit flag is sent to indicate whether there is further partitioning for each 8 by 8 partition. If this one-bit flat it is 1 for a 16 by 16 block partition, there no further partitioning may exist in each 8 by 8 partition. If this one-bit flag is 0, at least one 8 by 8 block partition of the 16 by 16 block partition may include further partitioning. Again, the different meanings associated with values of 1 or 0 for any flag could be defined the other way around, consistent with this disclosure. Each of Tables 2-4 sets forth exemplary variable length codes that may be used to signal the corresponding prediction mode used for each partition size. Of course, different codes or different meanings could be also assigned consistent with this disclosure.

Figure 5:
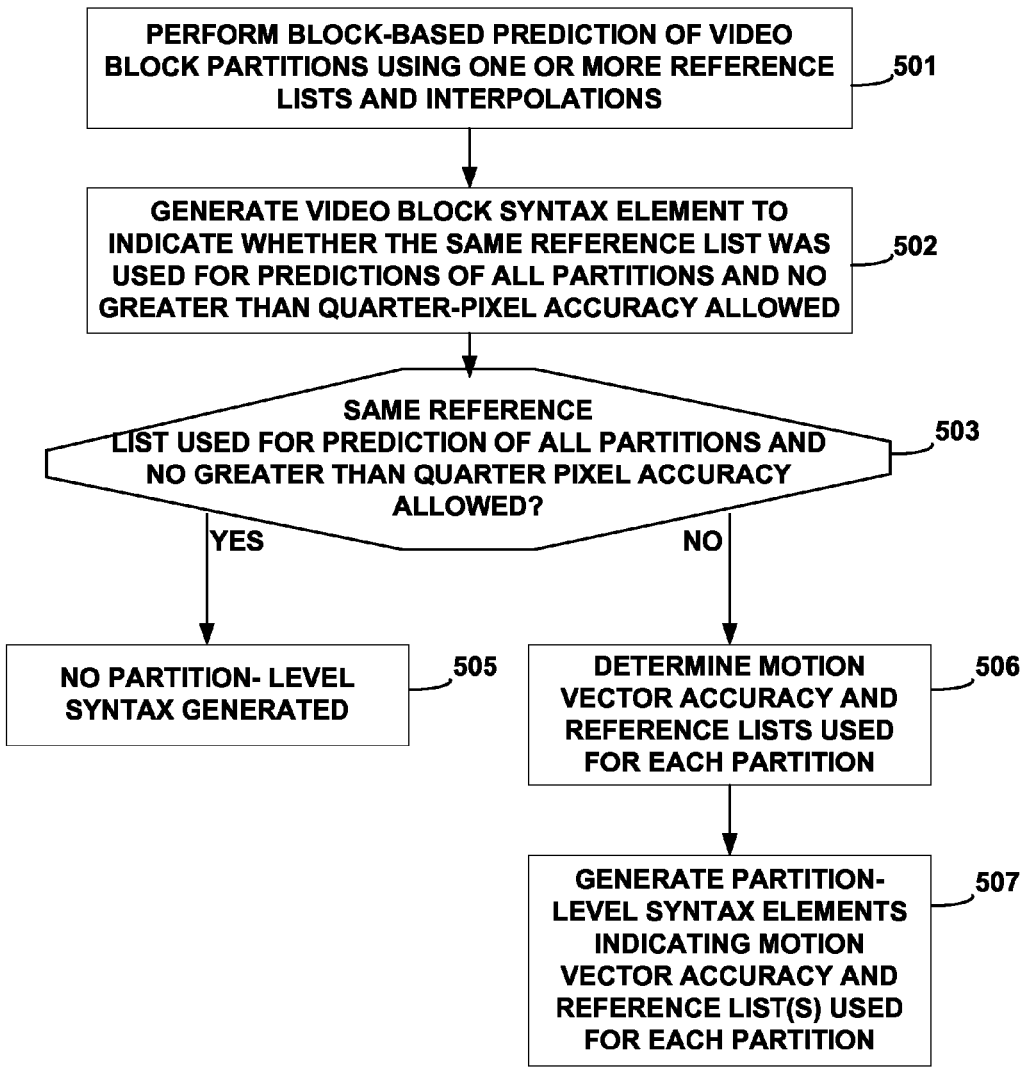
FIG. 5 is a flow diagram illustrating technique that may be performed by an encoding device according to this disclosure.

FIG. 5 is a flow diagram illustrating a technique that may be performed by an encoding device according to this disclosure and will be described from the perspective of video encoder 200 of FIG. 2. As shown in FIG. 5, prediction unit 210 of video encoder 200 performs block-based prediction of video block partitions using one or more reference lists and interpolations (501). Prediction unit 210 may include an interpolator 240 that interpolates predictive data during the block-based video coding to fractional precision. For inter coding, prediction unit 210 compares the partition to be encoded to various blocks in one or more reference lists comprising data from previous or subsequent frames or slices. For block-based intra coding, prediction unit 210 generates a predictive block based on neighboring data within the same coded unit.

Prediction unit 210 outputs the prediction block and adder 230 subtracts the prediction block from the video block being coded in order to generate a residual block. For block-based inter coding, prediction unit 210 may comprise motion estimation and motion compensation units that identify a motion vector that points to a prediction block and generates the prediction block based on the motion vector. Typically, motion estimation is considered the process of generating the motion vector, which estimates motion. For example, the motion vector may indicate the displacement of a predictive block within a predictive frame relative to the current block being coded within the current frame. Motion compensation is typically considered the process of fetching or generating the predictive block based on the motion vector determined by motion estimation. Integer pixels are simply fetched, but fractional pixels are generated by interpolator 240. If two reference lists of data are use for the prediction, video blocks may be generated as combinations (e.g. weighted combinations) of the data from two or more different lists.

Again, motion compensation for inter-coding may include interpolations to sub-pixel resolution. Interpolator 240 may perform such interpolations based on integer pixel values stored in memory 212 in order to allow motion prediction to sub-pixel resolutions. Interpolated predictive data generated by interpolator 240, for example, may be interpolated to half-pixel resolution, quarter-pixel resolution, one-eighth-pixel resolution, or even finer resolution. This permits motion estimation to estimate motion of video blocks to such sub-pixel resolution. Motion estimation and motion compensation may be based on one reference list of predictive data, or on a plurality of different reference lists, possibly using weighted combinations of data.

Syntax generator 250 generates a video block syntax element to indicate whether the same reference list of predictive data was used for the prediction all partitions of a given video block and no greater than quarter-pixel accuracy is allowed (502). This video block syntax element may comprise one-bit of information that can be set to zero or one so as to define whether the same reference list of predictive data was used for the prediction all partitions of the video block and no greater than quarter-pixel accuracy is allowed. If the same reference list was used for prediction of all of the partitions of a video block and no greater than quarter-pixel accuracy is allowed ("yes" 503), interpolator 240 is limited to no greater than quarter pixel accuracy and limited to the signal reference list. In this case, syntax generator 250 does not generate any partition-level syntax elements (505).

If the same reference list was not used for prediction of all of the partitions of a video block or a higher level of pixel accuracy (such as one-eight pixel accuracy) is allowed ("no" 503), interpolator 240 may not be limited to such quarter pixel accuracy or one list of predictive data. In some cases, one-eighth-pixel accuracy may be allowed for only one of the reference lists that is temporally closest to the video block. In such cases, syntax generator 250 may need to determine the motion vector accuracy and the reference list (or lists) used for each partition (506). Accordingly, syntax generator 250 generates partition level syntax elements indicating motion vector accuracy and the reference list (or lists) used for each partition (507). As outlined above, the partition-level syntax elements may each comprise a variable length code. The tables above outline one specific example of such variable length codes that may be used for various partitions within a 64 by 64 video block.

In addition to the variable length codes, in some cases, skip syntax elements may be used to indicate whether the video block is a 64 by 64 skipped block. Also, if the video block is not a 64 by 64 skipped block, the skip syntax elements may further indicate whether any of four 32 by 32 blocks are skipped blocks. Also, if any of the 32 by 32 blocks not are skipped blocks, the skip syntax elements may further indicate whether any of four 16 by 16 blocks are skipped blocks. In any case, the video block syntax element and partition-level syntax elements (if present) may be communicated with the video block from an encoding device to a decoding device as part of an encoded video stream.

Figure 6:
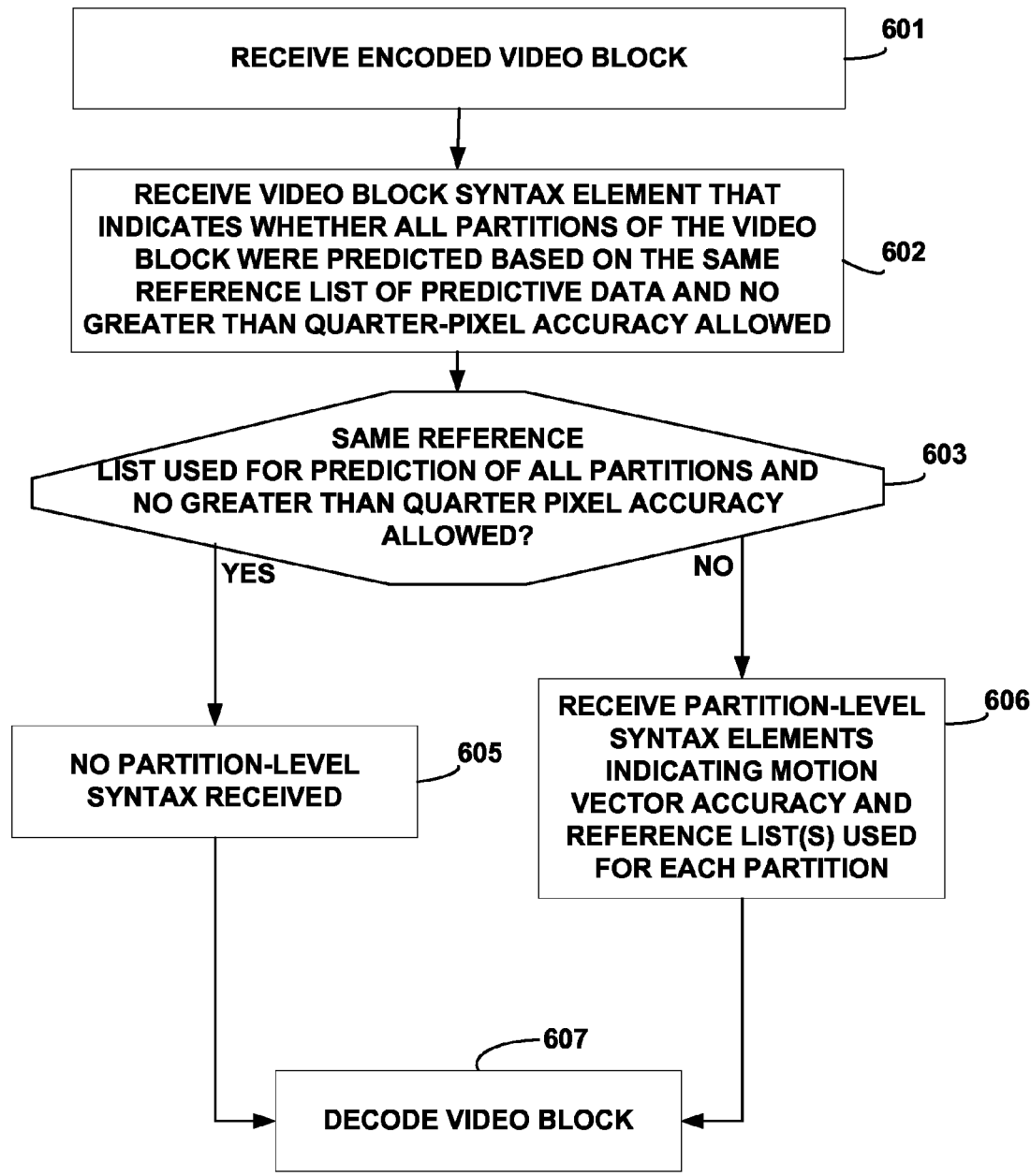
FIG. 6 is a flow diagram illustrating technique that may be performed by a decoding device according to this disclosure.

FIG. 6 is a flow diagram illustrating technique that may be performed by a decoding device according to this disclosure and will be described from the perspective of video decoder 300 of FIG. 3. As shown in FIG. 6, prediction unit 310 receives an encoded video block (601). Prediction unit 310 receives a video block syntax element with the video block to indicate whether all of the partitions of the video block are predicted based on a same one of the reference lists and no greater than quarter-pixel accuracy is allowed (602). Syntax decode unit 350 within prediction unit 310 may receive and interpret the video block syntax element as described herein.

If the video block syntax element indicates that all of the partitions of the video block are predicted based on the same one of the reference lists and no greater than quarter-pixel accuracy is allowed ("yes" 603), no partition-level syntax is received at prediction unit (605). In this case, the partition-level syntax is avoided because prediction unit 310 can presume that all of the partitions of the video block are predicted based on the same one of the reference lists (e.g., a default list such as reference list 0) and no greater than quarter-pixel accuracy is allowed.

If the video block syntax element indicates that all of the partitions of the video block are not predicted based on the same one of the reference lists or that greater than quarter-pixel accuracy is allowed ("no" 603), the video block syntax element defines motion vector accuracy to one-eighth-pixel accuracy for at least one of the reference lists and/or allows the use of more than one list in the predictions. Accordingly, in this case, syntax decode unit 350 of prediction unit 310 receives partition-level syntax elements indicating both the motion vector accuracy allowed and the reference list (or lists) of predictive data used for encoding each partition (606). Prediction unit 310 can then decode the video block based on the video block syntax element and the partition-level syntax elements (607), and in doing so may apply different lists of predictive data or different levels of interpolations for each partition, based on that defined by the partition-level syntax elements.

Again, the video block syntax element may comprise one-bit of information, and the partition-level syntax elements may each comprise a variable length code, e.g., as set forth in Tables 2-4. When one-eighth-pixel accuracy is allowed, it may only be allowed for only one of the reference lists that is temporally closest to the video block (such as reference list 0). In some cases, the syntax elements include skip syntax elements to further indicate, whether the video block is a 64 by 64 skipped block, if the video block is not a 64 by 64 skipped block, whether any of four 32 by 32 blocks are skipped blocks, and if any of the 32 by 32 blocks not are skipped blocks, whether any of four 16 by 16 blocks are skipped blocks.

As explained, various techniques of this disclosure may be performed by a video encoder or by a video decoder, which may comprise specific machines. The video encoders and decoders of this disclosure may be used or developed in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in at least partially in hardware or a processor. In different examples, the techniques may be implemented in hardware, software, firmware, or any combination thereof. Any features described as modules or components may also be implemented together in an integrated logic device or separately as discrete but interoperable logic devices. If implemented in software, the techniques may be realized at least in part by a tangible computer-readable storage medium comprising instructions that, when executed, performs one or more of the methods described above. The computer-readable data storage medium may form part of a computer program product, which may include packaging materials.

The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

The invention claimed is:

1. A method of encoding a video block that includes a plurality of partitions that are predicted from one or more reference lists, the method comprising:
    performing block-based prediction of the partitions of the video block;
    generating a video block syntax element for the video block to indicate whether all of the partitions of the video block are predicted based on a same one of the reference lists and no greater than quarter-pixel accuracy is used,
        wherein if the video block syntax element indicates that all of the partitions of the video block are predicted based on the same one of the reference lists and no greater than quarter-pixel accuracy is used, partition-level signaling of the reference lists is avoided, and
        wherein if the video block syntax element does not indicate that all of the partitions of the video block are predicted based on the same one of the reference lists and no greater than quarter-pixel accuracy is used, partition-level signaling of the reference lists occurs; and
    if the video block syntax element does not indicate that all of the partitions of the video block are predicted based on the same one of the reference lists and no greater than quarter-pixel accuracy is used, generating partition-level syntax elements for each of the partitions of the video block, wherein the partition-level syntax elements each identify one of the reference lists and motion vector accuracy for a given one of the partitions.

2. The method of claim 1, wherein the video block syntax element comprises one-bit of information.

3. The method of claim 1, wherein the partition-level syntax elements each comprise a variable length code.

4. The method of claim 1, if the video block syntax element does not indicate that all of the partitions of the video block are predicted based on the same one of the reference lists and no greater than quarter-pixel accuracy is used, partition-level signaling of the reference lists occurs, one-eighth-pixel accuracy is allowed for only one of the reference lists that is temporally closest to the video block.

5. The method of claim 1, further comprising:
generating skip syntax elements to indicate:
whether the video block is a 64 by 64 skipped block,
if the video block is not a 64 by 64 skipped block, whether any of four 32 by 32 blocks are skipped blocks, and
if any of the 32 by 32 blocks not are skipped blocks, whether any of four 16 by 16 blocks are skipped blocks.

6. The method of claim 1, further comprising communicating the video block syntax element with the video block from an encoding device to a decoding device.

7. A method of decoding a video block that includes a plurality of partitions that are predicted from one or more reference lists, the method comprising:
receiving a video block syntax element with the video block to indicate whether all of the partitions of the video block are predicted based on a same one of the reference lists and no greater than quarter-pixel accuracy is used,
wherein if the video block syntax element indicates that all of the partitions of the video block are predicted based on the same one of the reference lists and no greater than quarter-pixel accuracy is used, partition-level signaling of the reference lists is avoided, and
wherein if the video block syntax element does not indicate that all of the partitions of the video block are predicted based on the same one of the reference lists and no greater than quarter-pixel accuracy is used, partition-level signaling of the reference lists occurs,
if the video block syntax element does not indicate that all of the partitions of the video block are predicted based on the same one of the reference lists and no greater than quarter-pixel accuracy is used, receiving partition-level syntax elements for each of the partitions of the video block, wherein the partition-level syntax elements each identify one or more of the reference lists and motion vector accuracy for a given one of the partitions; and
decoding the video block based on the video block syntax element and the partition-level syntax elements.

8. The method of claim 7, wherein the video block syntax element comprises one-bit of information.

9. The method of claim 7, wherein the partition-level syntax elements each comprise a variable length code.

10. The method of claim 7, wherein the one-eighth-pixel accuracy is allowed for only one of the reference lists that is temporally closest to the video block.

11. The method of claim 1, further comprising receiving skip syntax elements that indicate:
whether the video block is a 64 by 64 skipped block,
if the video block is not a 64 by 64 skipped block, whether any of four 32 by 32 blocks are skipped blocks, and
if any of the 32 by 32 blocks not are skipped blocks, whether any of four 16 by 16 blocks are skipped blocks.

12. An apparatus that encodes video data, the apparatus comprising:
a prediction unit that encodes a video block that includes a plurality of partitions that are predicted from one or more reference lists, wherein the prediction unit performs block-based prediction of the partitions of the video block; and
a syntax generator that generates a video block syntax element for the video block to indicate whether all of the partitions of the video block are predicted based on a same one of the reference lists and no greater than quarter-pixel accuracy is used,
wherein if the video block syntax element indicates that all of the partitions of the video block are predicted based on the same one of the reference lists and no greater than quarter-pixel accuracy is used, partition-level signaling of the reference lists is avoided, and
wherein if the video block syntax element does not indicate that all of the partitions of the video block are predicted based on the same one of the reference lists and no greater than quarter-pixel accuracy is used, partition-level signaling of the reference lists occurs; and
wherein if the video block syntax element does not indicate that all of the partitions of the video block are predicted based on the same one of the reference lists and no greater than quarter-pixel accuracy is used, the syntax generator generates partition-level syntax elements for each of the partitions of the video block, wherein the partition-level syntax elements each identify one of the reference lists and motion vector accuracy for a given one of the partitions.

13. The apparatus of claim 12, wherein the prediction unit includes the syntax generator.

14. The apparatus of claim 12, wherein the prediction unit comprises at least one of:
a processor; and
hardware.

15. The apparatus of claim 12, wherein the video block syntax element comprises one-bit of information.

16. The apparatus of claim 12, wherein the partition-level syntax elements each comprise a variable length code.

17. The apparatus of claim 12, wherein the one-eighth-pixel accuracy is allowed for only one of the reference lists that is temporally closest to the video block.

18. The apparatus of claim 12, wherein the syntax generator further generates skip syntax elements to indicate:
whether the video block is a 64 by 64 skipped block,
if the video block is not a 64 by 64 skipped block, whether any of four 32 by 32 blocks are skipped blocks, and
if any of the 32 by 32 blocks not are skipped blocks, whether any of four 16 by 16 blocks are skipped blocks.

19. The apparatus of claim 12, further comprising a transmitter that communicates the video block syntax element with the video block to a decoding device.

20. An apparatus that decodes a video block that includes a plurality of partitions that are predicted from one or more reference lists, the apparatus comprising:
a prediction unit that receives and decodes the video block; and
a syntax decode unit that receives a video block syntax element to indicate whether all of the partitions of the video block are predicted based on a same one of the reference lists,
wherein if the video block syntax element indicates that all of the partitions of the video block are predicted based on the same one of the reference lists and no greater than quarter-pixel accuracy is used, partition-level signaling of the reference lists is avoided, and
wherein if the video block syntax element does not indicate that all of the partitions of the video block are predicted based on the same one of the reference lists and no greater than quarter-pixel accuracy is used, partition-level signaling of the reference lists occurs; and wherein if the video block syntax element does not indicate that all of the partitions of the video block are predicted based on the same one of the reference lists and no greater than quarter-pixel accuracy is used, the syntax decode unit receives partition-level syntax elements for each of the partitions of the video block, wherein the partition-level syntax elements each identify one of the reference lists and motion vector accuracy for a given one of the partitions, wherein the prediction unit decodes the video block based on the video block syntax element and the partition-level syntax elements.

21. The apparatus of claim 20, wherein the prediction unit includes the syntax decode unit.

22. The apparatus of claim 20, wherein the prediction unit comprises at least one of:
a processor; and
hardware.

23. The apparatus of claim 20, wherein the video block syntax element comprises one-bit of information.

24. The apparatus of claim 20, wherein the partition-level syntax elements each comprise a variable length code.

25. The apparatus of claim 20, wherein the one-eighth-pixel accuracy is allowed for only one of the reference lists that is temporally closest to the video block.

26. The apparatus of claim 20, wherein the syntax decode unit receives skip syntax elements that indicate:
whether the video block is a 64 by 64 skipped block,
if the video block is not a 64 by 64 skipped block, whether any of four 32 by 32 blocks are skipped blocks, and
if any of the 32 by 32 blocks not are skipped blocks, whether any of four 16 by 16 blocks are skipped blocks.

27. A device that encodes a video block that includes a plurality of partitions that are predicted from one or more reference lists, the device comprising:
means for performing block-based prediction of the partitions of the video block;
means for generating a video block syntax element for the video block to indicate whether all of the partitions of the video block are predicted based on a same one of the reference lists and no greater than quarter-pixel accuracy is used,
wherein if the video block syntax element indicates that all of the partitions of the video block are predicted based on the same one of the reference lists and no greater than quarter-pixel accuracy is used, partition-level signaling of the reference lists is avoided, and
wherein if the video block syntax element does not indicate that all of the partitions of the video block are predicted based on the same one of the reference lists and no greater than quarter-pixel accuracy is used, partition-level signaling of the reference lists occurs; and
if the video block syntax element does not indicate that all of the partitions of the video block are predicted based on the same one of the reference lists and no greater than quarter-pixel accuracy is used, means for generating partition-level syntax elements for each of the partitions of the video block, wherein the partition-level syntax elements each identify one of the reference lists and motion vector accuracy for a given one of the partitions.

28. The device of claim 27, wherein the video block syntax element comprises one-bit of information.

29. The device of claim 27, wherein the partition-level syntax elements each comprise a variable length code.

30. The device of claim 27, wherein the one-eighth-pixel accuracy is allowed for only one of the reference lists that is temporally closest to the video block.

31. The device of claim 27, further comprising means for generating skip syntax elements that indicate:
whether the video block is a 64 by 64 skipped block,
if the video block is not a 64 by 64 skipped block, whether any of four 32 by 32 blocks are skipped blocks, and
if any of the 32 by 32 blocks not are skipped blocks, whether any of four 16 by 16 blocks are skipped blocks.

32. The device of claim 27, further comprising means for communicating the video block syntax element with the video block from the device to another device.

33. The device of claim 27, wherein the means for performing block-based prediction includes the means for generating the video block syntax element and the means for generating partition-level syntax elements.

34. The device of claim 27, wherein the means for performing block-based prediction comprises at least one of:
a processor; and
hardware.

35. A device that decodes a video block that includes a plurality of partitions that are predicted from one or more reference lists, the device comprising:
means for receiving a video block syntax element with the video block to indicate whether all of the partitions of the video block are predicted based on a same one of the reference lists and no greater than quarter-pixel accuracy is used,
wherein if the video block syntax element indicates that all of the partitions of the video block are predicted based on the same one of the reference lists and no greater than quarter-pixel accuracy is used, partition-level signaling of the reference lists is avoided, and
wherein if the video block syntax element does not indicate that all of the partitions of the video block are predicted based on the same one of the reference lists and no greater than quarter-pixel accuracy is used, partition-level signaling of the reference lists occurs,
if the video block syntax element does not indicate that all of the partitions of the video block are predicted based on the same one of the reference lists and no greater than quarter-pixel accuracy is used, means for receiving partition-level syntax elements for each of the partitions of the video block, wherein the partition-level syntax elements each identify one or more of the reference lists and motion vector accuracy for a given one of the partitions; and
means for decoding the video block based on the video block syntax element and the partition-level syntax elements.

36. The device of claim 35, wherein the video block syntax element comprises one-bit of information.

37. The device of claim 35, wherein the partition-level syntax elements each comprise a variable length code.

38. The device of claim 35, wherein the one-eighth-pixel accuracy is allowed for only one of the reference lists that is temporally closest to the video block.

39. The device of claim 35, further comprising means for receiving skip syntax elements that indicate:
whether the video block is a 64 by 64 skipped block,
if the video block is not a 64 by 64 skipped block, whether any of four 32 by 32 blocks are skipped blocks, and
if any of the 32 by 32 blocks not are skipped blocks, whether any of four 16 by 16 blocks are skipped blocks.

40. The apparatus of claim 39, wherein the means for decoding the video block includes the means for receiving the video block syntax element and the means for receiving the partition-level syntax elements.

41. The device of claim 39, wherein the means for decoding the video block comprises at least one of:
- a processor; and
- hardware.

42. A computer-readable storage medium comprising instructions that upon execution in a processor, cause the processor to encode a video block that includes a plurality of partitions that are predicted from one or more reference lists, wherein the instructions cause the processor to:
- perform block-based prediction of the partitions of the video block;
- generate a video block syntax element for the video block to indicate whether all of the partitions of the video block are predicted based on a same one of the reference lists and no greater than quarter-pixel accuracy is used,
  - wherein if the video block syntax element indicates that all of the partitions of the video block are predicted based on the same one of the reference lists and no greater than quarter-pixel accuracy is used, partition-level signaling of the reference lists is avoided, and
  - wherein if the video block syntax element does not indicate that all of the partitions of the video block are predicted based on the same one of the reference lists and no greater than quarter-pixel accuracy is used, partition-level signaling of the reference lists occurs; and
- if the video block syntax element does not indicate that all of the partitions of the video block are predicted based on the same one of the reference lists and no greater than quarter-pixel accuracy is used, generate partition-level syntax elements for each of the partitions of the video block, wherein the partition-level syntax elements each identify one of the reference lists and motion vector accuracy for a given one of the partitions.

43. A computer-readable storage medium comprising instructions that upon execution in a processor, cause the processor to decode a video block that includes a plurality of partitions that are predicted from one or more reference lists, wherein the instructions cause the processor to:
- interpret a video block syntax element received with the video block to determine whether all of the partitions of the video block are predicted based on a same one of the reference lists and no greater than quarter-pixel accuracy is used,
  - wherein if the video block syntax element indicates that all of the partitions of the video block are predicted based on the same one of the reference lists and no greater than quarter-pixel accuracy is used, partition-level signaling of the reference lists is avoided, and
  - wherein if the video block syntax element does not indicate that all of the partitions of the video block are predicted based on the same one of the reference lists and no greater than quarter-pixel accuracy is used, partition-level signaling of the reference lists occurs,
- if the video block syntax element does not indicate that all of the partitions of the video block are predicted based on the same one of the reference lists and no greater than quarter-pixel accuracy is used, interpret partition-level syntax elements for each of the partitions of the video block, wherein the partition-level syntax elements each identify one or more of the reference lists and motion vector accuracy for a given one of the partitions; and
- decode the video block based on the video block syntax element and the partition-level syntax elements.

* * * * *